US011824633B1

(12) United States Patent
Kim et al.

(10) Patent No.: US 11,824,633 B1
(45) Date of Patent: Nov. 21, 2023

(54) COMMUNICATION DEVICE, COMPUTER PROGRAM PRODUCT, AND COMMUNICATION SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Suh Wuk Kim, Tokyo (JP); Hiroki Kudo, Kawasaki Kanagawa (JP); Yasuyuki Tanaka, Kawasaki Kanagawa (JP); Masaki Nishio, Yokohama Kanagawa (JP); Yuma Nogami, Tokyo (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/822,759

(22) Filed: Aug. 26, 2022

(30) Foreign Application Priority Data

Feb. 14, 2002 (JP) .................................. 2022-020347

(51) Int. Cl.
*H04J 3/06* (2006.01)

(52) U.S. Cl.
CPC .................................. *H04J 3/0635* (2013.01)

(58) Field of Classification Search
CPC ......... H04L 69/18; H04L 69/08; H04L 69/28; H04L 67/12; H04J 3/0667; H04J 3/0697; H04J 3/0676; H04Q 9/00; H04Q 9/04; G08C 17/00; G08C 17/02; G08C 15/06; H04W 56/002; H04W 4/70;

(Continued)

(56) References Cited

U.S. PATENT DOCUMENTS 9,693,325 B1 * 6/2017 Park .................. H04W 56/0005
10,862,602 B2 * 12/2020 Matsunaga ............. H04L 67/12
(Continued)

FOREIGN PATENT DOCUMENTS

JP          5849829 B2     2/2016
JP     2016-163305 A     9/2016
(Continued)

OTHER PUBLICATIONS

D. Mills et al., "IETF RFC 5905: Network Time Protocol Version 4: Protocol and Algorithms Specification," 110 pages (2010).
(Continued)

*Primary Examiner* — Jung Liu
(74) *Attorney, Agent, or Firm* — Finnegan, Henderson, Farabow, Garrett & Dunner, LLP

(57) ABSTRACT

A communication device includes one or more processors. The processors acquire, from at least one electronic device, output data output from the electronic device and current time information managed by the electronic device. The processors communicate with a server device using a communication technique in which numbers indicating communication timings are synchronized, and transmits the output data to the server device. The processors calculate corrected time information by correcting the current time information on the basis of a reference number indicating a number serving as a reference. The processors set the calculated corrected time information in the electronic device.

18 Claims, 7 Drawing Sheets

(58) Field of Classification Search
CPC . H04W 56/0005; H04W 48/16; H04W 84/18;
G04G 7/00; G04G 5/00
See application file for complete search history.

(56) References Cited

U.S. PATENT DOCUMENTS

| | | | |
|---|---|---|---|
| 11,215,993 B2* | 1/2022 | Lim | G06Q 10/02 |
| 11,551,486 B1* | 1/2023 | Everett | G07C 5/0858 |
| 2009/0222589 A1* | 9/2009 | Kirsch | G04G 7/00 |
| | | | 709/248 |
| 2009/0252087 A1* | 10/2009 | Jiang | H04W 4/02 |
| | | | 370/328 |
| 2010/0086091 A1* | 4/2010 | Park | H04L 69/28 |
| | | | 375/356 |
| 2014/0355628 A1* | 12/2014 | Akhlaq | H04W 56/001 |
| | | | 370/509 |
| 2016/0262102 A1 | 9/2016 | Sakata et al. | |
| 2022/0021471 A1 | 1/2022 | Kim et al. | |

FOREIGN PATENT DOCUMENTS

| | | |
|---|---|---|
| JP | 5998909 B2 | 9/2016 |
| JP | 2018-121366 A | 8/2018 |
| JP | 6398359 B2 | 10/2018 |

OTHER PUBLICATIONS

T. Mizrahi et al., "IETF RFC 7822: Network Time Protocol Version 4 (NTPv4) Extension Fields," 8 pages (2016).

* cited by examiner

| NODE IDENTIFIER | GENERATION TIME | SENSOR DATA |
|---|---|---|
| $100_1$ | 12:00:00 | VALUE SD1 |
| $100_1$ | 12:00:00 | VALUE SD2 |
| $100_2$ | 12:00:00 | VALUE SD3 |
| ⋮ | ⋮ | ⋮ |
| $100_{13}$ | 12:30:00 | VALUE SD4 |
| $100_1$ | 12:30:00 | VALUE SD5 |

COMMUNICATION DEVICE, COMPUTER PROGRAM PRODUCT, AND COMMUNICATION SYSTEM

CROSS-REFERENCE TO RELATED APPLICATIONS

This application is based upon and claims the benefit of priority from Japanese Patent Application No. 2022-020347, filed on Feb. 14, 2022; the entire contents of which are incorporated herein by reference.

FIELD

Embodiments described herein relate generally to a communication device, a computer program product, and a communication system.

BACKGROUND

There has been proposed a communication system that collects sensor data acquired by sensors connected to communication devices (nodes), respectively, from the communication devices over a network. In such a communication system, it may be necessary to perform control to synchronize the times of the devices in order to synchronize sensor data acquisition timings (sensing timings).

For example, there have been proposed a technology for enabling each of the communication devices to have a global positioning system (GPS) reception function, and a technology for distributing an absolute time on the basis of IETF RFC5905 (network time protocol (NTP)) or the like.

However, the conventional art has a problem that the time synchronizing function is complicated. For example, in the technology using the GPS, the GPS is not necessarily available at a position where the sensor is installed, and power consumption also increases. In the technology for distributing an absolute time, power consumption increases according to an increase in control traffic, and an additional memory and further control for managing the absolute time are required in the communication device.

DETAILED DESCRIPTION

According to one embodiment,

Hereinafter, a communication device, a communication method, a computer program product, and a communication system according to preferred embodiments of the present invention will be described in detail with reference to the accompanying drawings.

In the communication system according to the present embodiment, a reference number serving as a reference for controlling a timing is distributed from a concentrator (an example of a device that collects sensor data from a communication device). The communication device determines a processing timing (such as a timing at which sensor data is to be acquired) on the basis of the reference number. In addition, the communication device corrects (adjusts) a time of an electronic device to be used to acquire sensor data using the reference number.

The reference number is, for example, a number representing every hour on the hour. Although the communication device is not capable of grasping a current time, the communication device is capable of grasping how much time has elapsed from the hour every hour. The communication device periodically inquires of the electronic device about the current time, and corrects the current time with reference to the elapsed time. As a result, it is not necessary to manage an absolute time according to an NTP or the like, and the time of the electronic device can be adjusted with a simpler configuration.

Hereinafter, an example of a communication system that collects sensor data (an example of output data) output from a data logger (an example of an electronic device) will be mainly described. The applicable communication system is not limited thereto, and the electronic device and the output data may be any device and any data. For example, the communication system may be configured to collect sensor data output from a sensor (an example of an electronic device), rather than collecting sensor data through a data logger. In addition, for example, the following output data may be used.

Figure 1:
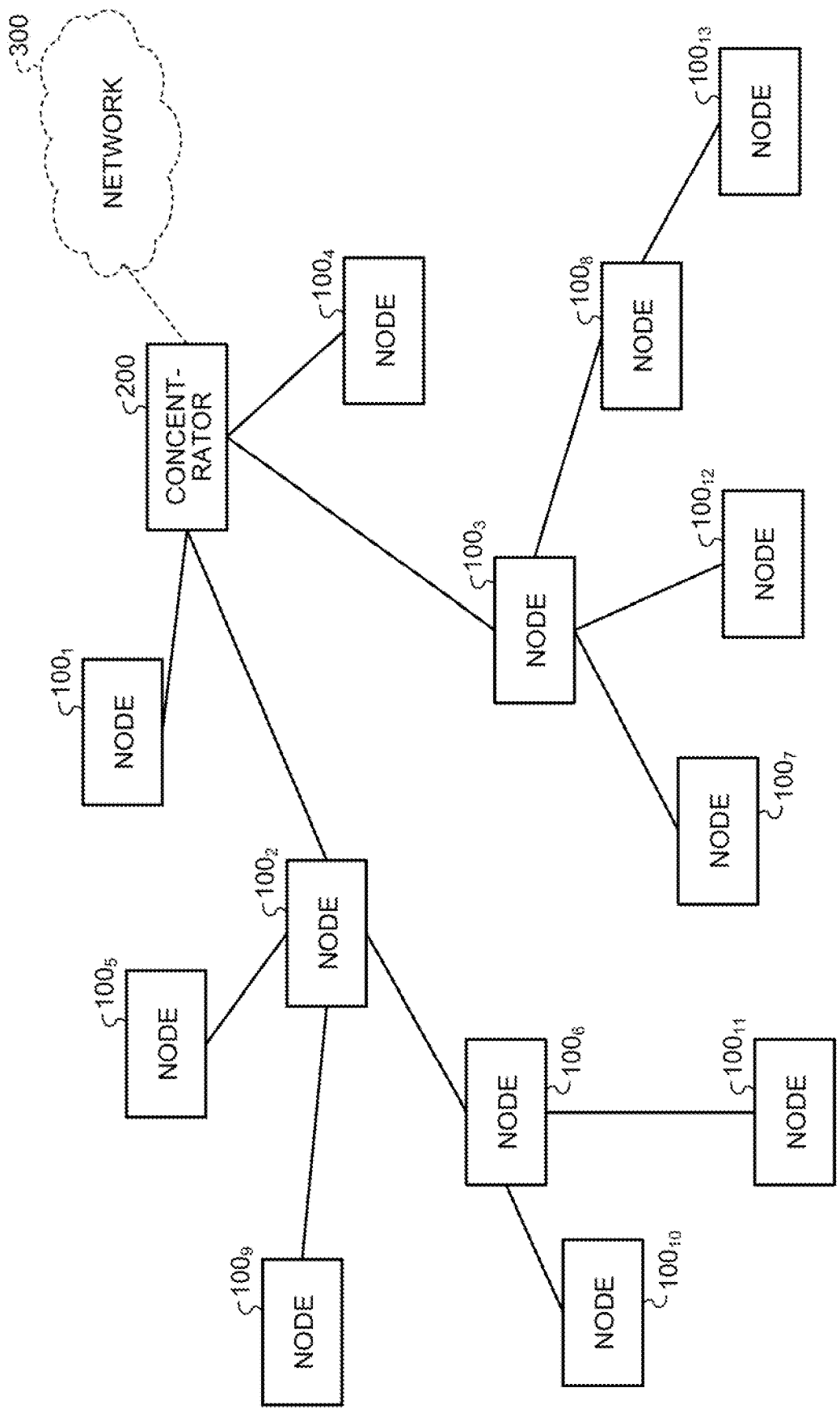
FIG. 1 is a configuration diagram of a communication system according to the present embodiment.

- voltage data indicating a voltage of a battery built in or connected to an electronic device
- latitude data and longitude data obtained by a GPS reception function of an electronic device
- warning data indicating that certain data (sensor data) has greatly changed FIG. 1 is a diagram illustrating a configuration example of the communication system according to the present embodiment. As illustrated in FIG. 1, the communication system according to the present embodiment includes a concentrator 200 (an example of a server device) and more than one nodes $100_1$ to $100_{13}$ (an example of a communication device).

Each of the nodes $100_1$ to $100_{13}$ transmits sensor data, which is acquired by a sensor connected thereto through a data logger (or a built-in sensor), to the concentrator 200. The nodes $100_1$ to $100_{13}$ can have the same configuration as one another. Therefore, the nodes $100_1$ to $100_{13}$ may be simply referred to as nodes 100 in a case where they do not need to be distinguished from each other. The number of nodes 100 is not limited to thirteen, and may be any number.

The concentrator 200 is a device (aggregation device) serves to aggregate sensor data transmitted from each of the nodes 100.

The concentrator 200 and the nodes $100_1$ to $100_{13}$ constitute a wireless multi-hop network. Communication in the wireless multi-hop network is controlled by, for example, a time-division multiplexing technique. While the wireless communication technique may be any technique, IEEE 802.11, IEEE 802.15.4, or the like can be applied, for example.

The concentrator 200 may be connected to a network 300 in addition to the wireless multi-hop network. The network 300 may be in any network, for example, a wide area network such as the Internet, a closed network in a wide area, or a local network such as an intra-company network.

Connection between the concentrator 200 and the network 300 may be wired connection using an Ethernet (registered trademark) cable, an optical fiber, or the like, or may be wireless connection using a mobile phone network or a satellite line. The connection to the network 300 is not essential, and the communication system may be constituted by a wireless multi-hop network only including the concentrator 200 and the nodes $100_1$ to $100_{13}$.

Note that the network 300 may be connected to, for example, a server device serving to collect sensor data from two or more concentrators 200 and execute processing using the collected sensor data.

The outline of timing control performed by the communication system according to the present embodiment will be described.

The concentrator 200 transmits, over a wireless multi-hop network, a reference number (reference time information) corresponding to a reference time for calculating a timing (acquisition timing) at which sensor data is to be acquired. The reference number is a number serving as a reference among numbers indicating communication timings synchronized using a time-division multiplexing technique. For example, time-slotted channel hopping (TSCH) or the like can be applied as a time-division multiplexing technique. The number indicating the communication timing is, for example, a time slot number (an absolute slot number (ASN)), a slot frame number, a super frame number, or the like. For example, the reference number is determined as a number corresponding to every hour on the hour (every hour including 0:00 AM). Hereinafter, a case where the reference number is a number corresponding to every hour on the hour will be described as an example.

At least a sensor data acquisition interval is set in advance in each of the nodes 100. The node 100 determines a next timing at which sensor data is to be acquired, on the basis of three values of the reference number transmitted from the concentrator 200, the current number managed by the node 100 itself, and the sensor data acquisition interval.

Such an operation is executed by each of the nodes 100, and accordingly, each of the nodes 100 can control a timing at which sensor data is to be acquired. That is, sensor data acquisition timings can be synchronized between the plural sensors. Moreover, the node 100 can realize timing control with a simpler configuration, without having to manage the absolute time.

Until receiving a reference number, the node 100 repeats the acquisition of the sensor data according to a sensor data acquisition interval, starting from a time (e.g., a time at which the node enters the network) determined by another method. In other words, while the concentrator 200 does not transmit a reference number, the node 100 in the network can perform an operation to which the present embodiment is not applied.

Next, an outline of sensor data collection processing performed by the communication system according to the present embodiment will be described.

A data logger is connected to the node 100. A sensor is connected to the data logger. The node 100 obtains new sensor data from the data logger, in a polling manner, for example. At this time, the node 100 obtains the sensor data itself and data indicating a sensing time of the sensor data. The sensing time is, for example, a time at which the sensor data is recorded in the data logger, but is not limited thereto. For example, in a case where the sensor is preheated, the sensing time may be a time at which the pre-heating is started. The pre-heating is processing for warming the sensor for a certain period of time in a state where power is supplied to the sensor before data is obtained from the sensor. For example, it is assumed here that the pre-heating is started at 10:00:00, the pre-heating is completed at 10:00:20, and the sensor data is recorded in the data logger at 10:00:20. In this case, 10:00:00 is recorded as a sensing time in the data logger.

The node 100 needs to wirelessly transmit data corresponding to these two kinds of data (the sensor data and the sensing time), but it is preferable to reduce an amount of data as much as possible. It is preferable to reduce, for example, an amount of data indicating the sensing time. Note that, in the following description, data in a format of indicating a time used in daily life (an actual time to be described later), such as "2021/08/23 11:30:00.000", may be referred to as "time data".

In order to reduce an amount of data, the node 100 transmits, as data indicating a sensing time, a number indicating a communication timing (a time slot number, a slot frame number, and a super frame number) already used in the wireless multi-hop network to implement time-division multiplexing communication, in place of time data.

The node 100 polls the data logger at the beginning of each time slot to check whether new sensor data has been obtained. When there is new data, the node 100 wirelessly transmits the obtained sensor data along with a current time slot number.

In a case where the node 100 relays sensor data transmitted from another node 100 (an example of an external communication device) to the concentrator 200, the node 100 may collectively transmit the sensor data having the same time slot number. Specifically, a message to be transmitted wirelessly is generated in such a manner that pieces of sensor data are associated with only one time slot number in the message. As a result, it is possible to further reduce an amount of data to be transmitted.

Figures 2, 3:
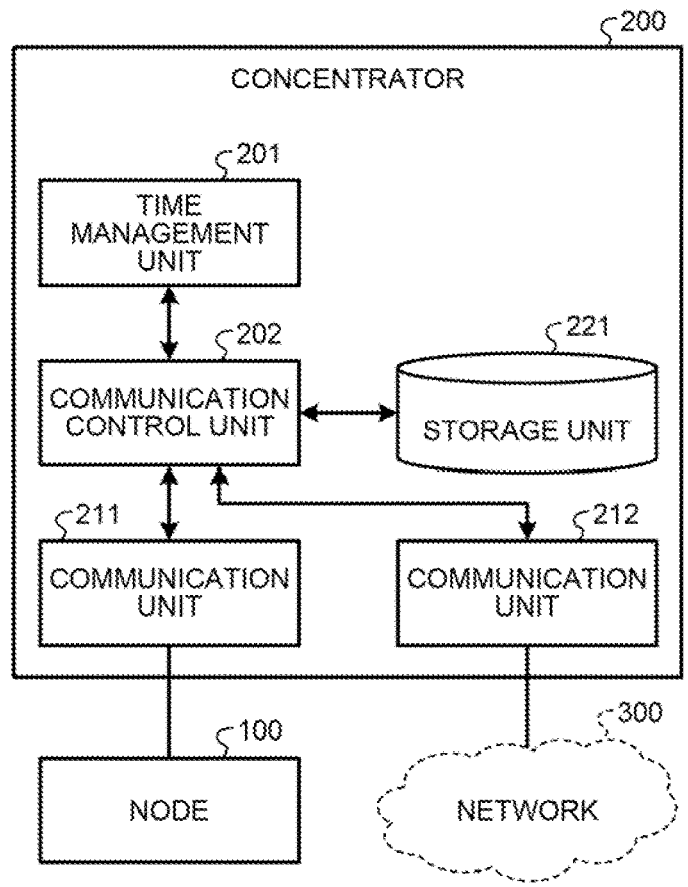
FIG. 2 is a functional block diagram of a concentrator.
FIG. 3 is a diagram illustrating an example of a data structure of sensor data.

Next, a functional configuration example of the concentrator 200 will be described. FIG. 2 is a block diagram illustrating an example of a functional configuration of the concentrator 200. As illustrated in FIG. 2, the concentrator 200 includes a time management unit 201, a communication control unit 202, communication units 211 and 212, and a storage unit 221.

The storage unit 221 stores various kinds of data used in the concentrator 200. For example, the storage unit 221 stores sensor data transmitted from each node 100 and data to be transmitted to each node, for example, control information. In a case where sensor data is stored and managed by a storage device outside the concentrator 200, the storage unit 221 does not need to be provided in the concentrator 200.

The storage unit 221 can be formed of any generally used storage medium such as a flash memory, a memory card, a random access memory (RAM), a hard disk drive (HDD), or an optical disc.

The communication unit 211 communicates with each node 100 and constitutes a wireless multi-hop network. The communication performed in the wireless multi-hop network is controlled by the time-division multiplexing technique as described above, so that the communication unit 211 operates to switch processing for each time slot. That is, the communication unit 211 performs transmission processing in a time slot in which the communication unit 211 is capable of transmitting data, and performs reception processing in a time slot in which the communication unit needs to stand by to receive data. In a case where there is no data to be transmitted in spite of a time slot in which the communication unit is capable of transmitting data, and in a time slot in which the communication unit is capable of neither transmission nor reception, the communication unit 211 does not perform any operation. In a time slot in which neither transmission processing nor reception processing is performed, the communication unit 211 can transition to an ultra-low power consumption mode, a power-off mode, or the like to stop the operation. In a period during which the communication unit 211 does not perform any operation, the entire concentrator 200 may also operate in the ultra-low power consumption mode.

The communication unit 212 is used for communication with the network 300. When the concentrator 200 is not connected to the network 300, the communication unit 212 does not need to be provided in the concentrator 200.

The time management unit 201 manages a current time as an actual time. The actual time refers to a time used in daily life whose one day is 24 hours. The time management unit 201 may acquire the current time by any means. For example, the following means can be applied.

Obtaining current time information from a time server on the network 300

Obtaining current time information by a GPS

Obtaining current time information from a base station of a mobile phone

Inputting a current time by a person manually

It is assumed that the time management unit 201 can acquire current time information at an appropriate frequency in accordance with an accuracy of a crystal oscillator (clock) of the concentrator 200, and always hold a current time within an error range in which there is no problem in practical use during an operation to be described below.

For example, it is assumed that, although the concentrator 200 does not have an accurate current time immediately after shipment from a factory and immediately after power is turned on, the time management unit 201 can recognize that such a concentrator 200 does not have a current time. While not having current time information, the concentrator 200 does not perform an operation to be described below. For example, it is assumed that, when current time information is acquired, the concentrator 200 starts an operation to be described below. Once the current time information is acquired, the concentrator 200 may or may not continue to acquire current time information at a predetermined timing (such as after a certain period of time elapses). In a case where current time information is continuously acquired at a predetermined timing, the concentrator 200 may operate "with no current time information" when the concentrator 200 fails to acquire current time information, or the concentrator 200 may continue to operate "with time information".

The communication control unit 202 controls communication between the node 100 and the network 300. For example, the communication control unit 202 switches the operation of the communication unit 211 as described above in accordance with a time-division multiplexing schedule. Moreover, the communication control unit 202 establishes and maintains a wireless multi-hop network, and receives and transfers sensor data transmitted via the wireless multi-hop network. In a case where the concentrator 200 is connected to the network 300, the communication control unit 202 may or may not transfer the sensor data received via the communication unit 212 to the network 300. Moreover, the communication control unit 202 may or may not store the sensor data in the storage unit 221. Moreover, the communication control unit 202 may or may not transfer the sensor data stored in the storage unit 221 to the network 300. Moreover, the communication control unit 202 transmits control information or the like to the node 100.

Moreover, the communication control unit 202 transmits a reference number to the node 100. When it is determined that the current time managed by the time management unit 201 is not correct, the communication control unit 202 may be configured not to transmit a reference number. For example, in a case where current time information cannot be synchronized with that in a time server, a GPS, a base station, or the like because of abnormality of communication or the like, or in a case where a certain period of time has elapsed after the synchronization cannot be executed, the communication control unit 202 determines that the current time is not correct and does not transmit a reference number. Thereafter, when execution of synchronization can be resumed, the communication control unit 202 transmits a reference number.

FIG. 3 is a diagram illustrating an example of a data structure of sensor data stored in the storage unit 221. The sensor data is stored in association with a node identifier and a generation time. The node identifier is an example of identification information for identifying the node 100 from which the sensor data is transmitted. The generation time is a time at which the sensor data is acquired (generated).

The sensor data to be transmitted to the concentrator 200 includes not only a value (read value) acquired from the sensor but also time data indicating a time when the value is acquired. In a case where a number (for example, a time slot number) indicating a communication timing is transmitted instead of the time data, the concentrator 200 calculates an actual time corresponding to the time slot number included in the sensor data by using the time management unit 201 and the communication control unit 202. This processing makes it possible to manage the sensor data together with the generation time. The concentrator 200 may treat a time slot number as it is as a generation time without converting the generation time into an actual time. In addition, a time at which concentrator 200 receives each piece of sensor data can also be managed in the same manner, but an associated reception time may or may not be recorded in the storage unit 221.

The above-described units (the time management unit 201 and the communication control unit 202) are implemented by, for example, one or more hardware processors. Each of the above-described units may be implemented by causing a processor such as a central processing unit (CPU) to execute a computer program, that is, implemented by software. The each of the above-described units may be implemented by the processor such as a dedicated integrated circuit (IC), that is, implemented by hardware. Each of the above-described units may be implemented by software and hardware in combination. In a case where plural processors are used, each of the processors may implement one of the units, or may implement two or more of the units.

Figure 4:
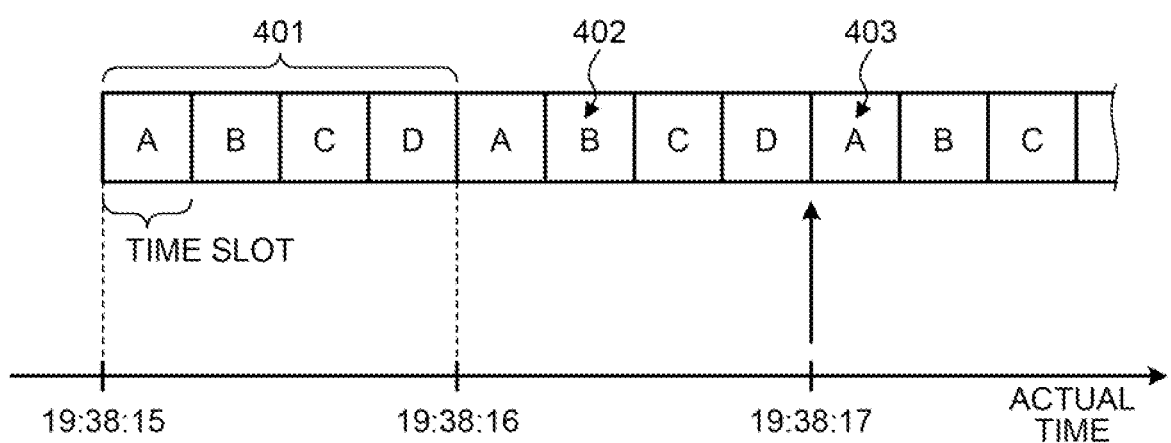
FIG. 4 is a diagram illustrating a relationship between an actual time and a time-division multiplexing time slot.

An example of control of time-division multiplexing communication performed by the communication control unit 202 will be described. FIG. 4 is a diagram illustrating a relationship between an actual time and a time-division multiplexing time slot. As illustrated in FIG. 4, it is assumed that the concentrator 200 starts the wireless multi-hop network at 19:38:15. One time slot has a length of, for example, 250 milliseconds, and four time slots constitute a unit 401 of a time-division multiplexing schedule. Thus, if the schedule does not change after 19:38:15, the same communication schedule is repeated every second. A, B, C, and D represent four schedules to be executed every second.

Each time slot is assigned a time slot number. In the example of FIG. 4, assuming that, a time slot, number of a time slot immediately after the concentrator 200 starts the wireless multi-hop network is an integer n, a time slot number n+5 is assigned to a sixth time slot 402 from the top. For example, if the time slot number n of the initial time slot (the time slot corresponding to the left end "A" in FIG. 4) is "0", the time slot number of the time slot 402 is "5". Basically, the time slot number monotonically increases. In a case where there is an upper limit value for the time slot number, the time slot number returns to "0" after reaching the upper limit value, and monotonically increases again.

Such time-division multiplexing communication schedules and time slot numbers are managed by the communication control unit 202 of the concentrator 200. The communication control unit 202 can associate an actual time and a time slot number with each other by obtaining a current time from the time management unit 201. In the example of FIG. 4, the communication control unit 202 can determine that a time slot 403 whose time slot number is n+8 starts at 19:38:17.

Figure 5:
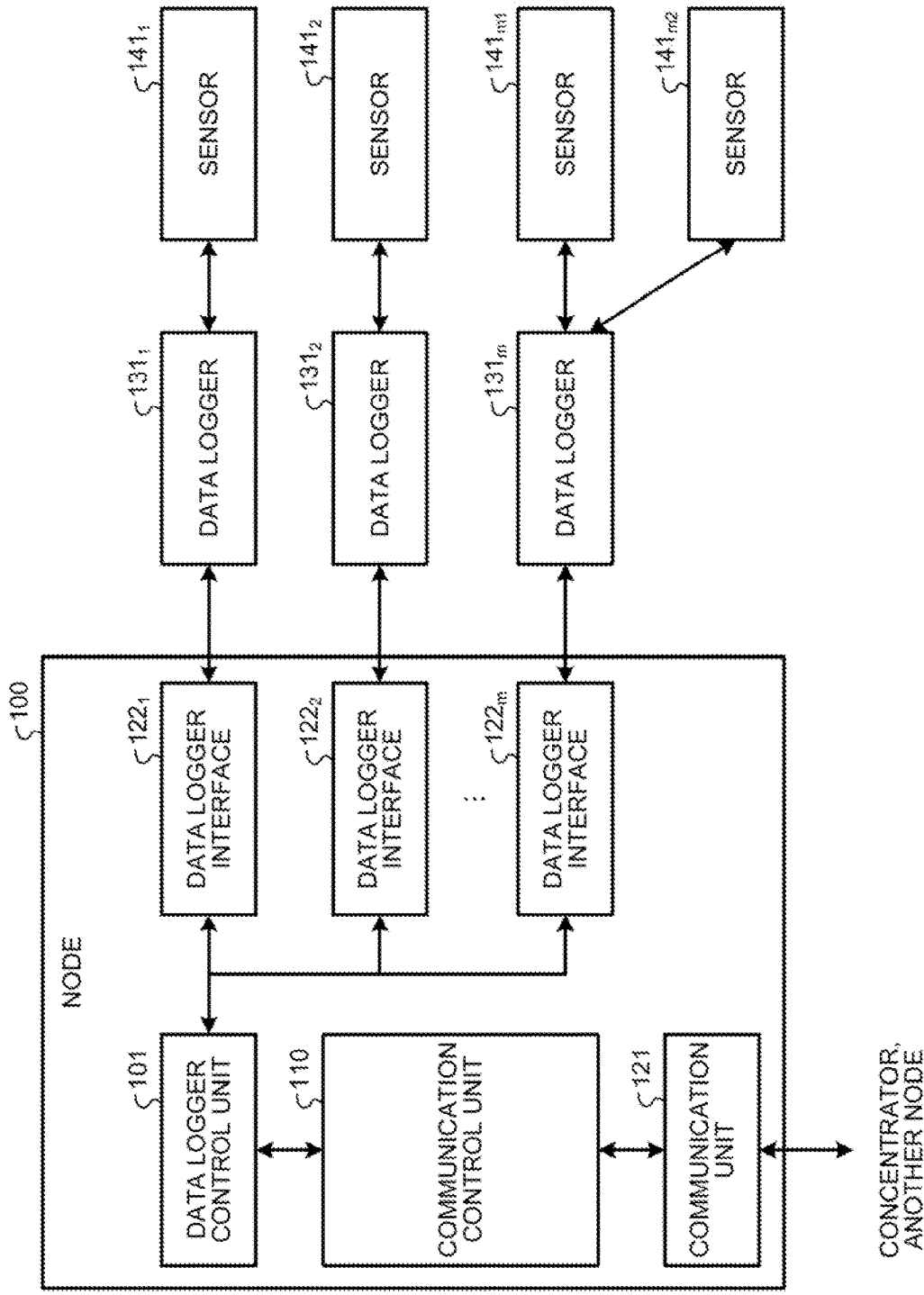
FIG. 5 is a functional block diagram of a node.

Next, a configuration of the node 100 will be described. FIG. 5 is a block diagram illustrating an example of a functional configuration of the node 100. As illustrated in FIG. 5, the node 100 includes a data logger control unit 101 (an example of an acquisition control unit), a communication control unit 110, a communication unit 121, and one or more data logger interfaces $122_1$ to $122_m$ (m is an integer of 1 or more).

The data logger interfaces $122_1$ to $122_m$ are connected to data loggers $131_1$ to $131_m$, respectively. Any of the sensors $141_1$ to $141_{m2}$ is connected to each of the data loggers $131_1$ to $131_m$.

The data logger interfaces $122_1$ to $122_m$ are simply referred to as data logger interfaces 122 in a case where they do not need to be distinguished from each other. Also, the data loggers $131_1$ to $131_m$ are simply referred to as data loggers 131 in a case where they do not need to be distinguished from each other. Similarly, the sensors $141_1$ to $141_{m2}$ are simply referred to as sensors 141 in a case where they do not need to be distinguished from each other.

The sensor 141 is an electronic device serves to output, as sensor data, a result of detecting a predetermined physical quantity. The physical quantity to be detected may be any physical quantity. The data logger 131 is an electronic device that operates as a data recording device that records sensor data detected by the sensor 141 in a storage medium (internal memory).

One or more sensors 141 are connected to each of the data loggers 131. In FIG. 5, as an example, while one sensor 141 (the sensor $141_1$ or the sensor $141_2$) is connected to each of the data loggers $131_1$ and $131_2$, and two sensors $141_{m1}$ and $141_{m2}$ are connected to the data logger $131_m$, but the connection topology between the data loggers 131 and the sensors 141 is not limited to this example.

The communication unit 121 operates similarly to the communication unit 211 of the concentrator 200.

As in the communication control unit 202 of the concentrator 200, the communication control unit 110 switches the operation of the communication unit 121 in accordance with a time-division multiplexing communication schedule. Moreover, the communication control unit 110 discovers and connects a wireless multi-hop network started by the concentrator 200, and sets and changes a communication path, a communication schedule, and the like. For these operations, the communication control unit 110 transmits and receives a control frame including a beacon to and from another node 100 via the communication unit 121.

In addition, the communication control unit 110 receives a reference number from the concentrator 200. If the node 100 is not directly connected to the concentrator 200 (e.g., the nodes $100_5$ to $100_{13}$ in FIG. 1), it receives a reference number from the concentrator 200 via another node 100.

The communication control unit 110 also controls communication with another node 100 constituting the wireless multi-hop network. For example, the communication control unit 110 receives, from another node 100, sensor data acquired by this node 100. Moreover, the communication control unit 110 manages data to be transmitted to another node 100 or the concentrator 200, and generates a transmission message. For example, the communication control unit 110 transmits sensor data associated with a time at which the sensor data is acquired to the concentrator 200 as a destination.

Nodes 100 other than nodes 100 directly connected to the concentrator 200 (the nodes $100_1$ to $100_4$ in FIG. 1) transmit sensor data to the concentrator 200 via another node 100 as a relay device serving to relay communication with the concentrator 200.

The data logger control unit 101 has a function of acquiring sensor data and current time information from the data logger 131 via the data logger interface 122, and a function of setting a time in the data logger 131.

Figure 6:
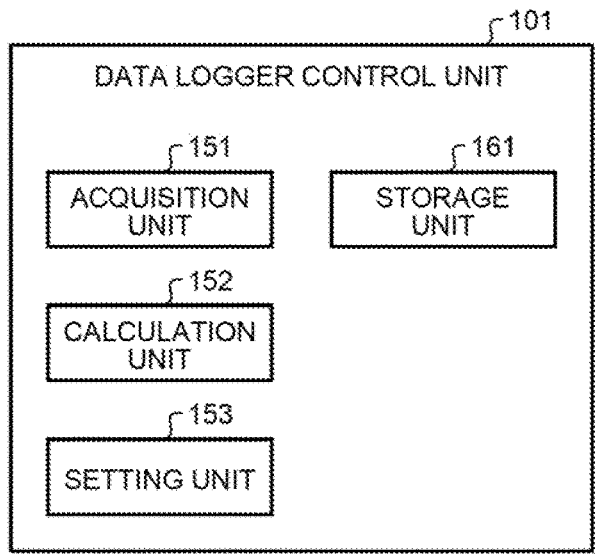
FIG. 6 is a functional block diagram of a data logger control unit.

FIG. 6 is a block diagram illustrating a detailed functional configuration example of the data logger control unit 101. As illustrated in FIG. 6, the data logger control unit 101 includes an acquisition unit 151, a calculation unit 152, a setting unit 153, and a storage unit 161.

The acquisition unit 151 acquires, from the data logger 131, the sensor data output from the data logger 131. For example, the data logger control unit 101 reads a latest sensor data number or latest sensor data itself recorded in the internal memory of the data logger 131 via the data logger interface 122. This processing is called polling.

The acquisition unit 151 may set a polling interval for each data logger interface 122, and perform polling at the set polling interval via the corresponding data logger interface 122. The acquisition unit 151 may perform polling in response to an instruction from the concentrator 200. The polling interval may be changed during operation. In a case where so-called preliminary energization or pre-heating is required to acquire sensor data, the acquisition unit 151 calculates back a time from a time slot in which the sensor data is acquired to start preliminary energization in advance. The preliminary energization and pre-heating may be controlled by the data logger 131 itself. In addition, the preliminary energization and the pre-heating do not need to be started at the time calculated back from the time slot in which the sensor data is acquired. For example, the preliminary energization and the pre-heating may be started from the time slot in which the sensor data is acquired.

In addition, the acquisition unit 151 acquires current time information managed by the data logger 131 from the data logger 131. For example, the acquisition unit 151 transmits a command for acquiring a current time to the data logger 131, and obtains a time managed in the data logger 131.

The data logger 131 manages the time, for example, using a real time clock (RTC). The time management method is not limited thereto, and may be any other method. The time may be expressed by a real time, or may be expressed by how much time has elapsed from a specific timing (elapsed seconds) such as UNIX (registered trademark) time.

Using the reference number transmitted from the concentrator 200, the calculation unit 152 calculates corrected time information indicating a time at which the current time information acquired from the data logger 131 is corrected.

The node 100 has a function of counting time slot numbers to manage time-division multiplexing schedules. For example, using a difference between the reference number and a current time slot number and a length of one time slot number (e.g., 250 milliseconds), the calculation unit 152 can calculate an elapsed time from the hour indicated by the reference number.

Among a current hour, a current minute, and a current second included in current time information, the calculation unit 152 replaces the current minute and the current second with a minute and a second corresponding to the elapsed time to calculate corrected time information. Note that the current hour, the current minute, and the current second indicate a current hour, minute, and second represented by the current time information, respectively.

In this manner, the calculation unit 152 interprets that the current hour is correct among the current time information acquired from the data logger 131, and corrects the current minute and the current second to a minute and a second corresponding to the elapsed time calculated using the reference number. As long as an error occurs in the time information managed by the data logger 131 within an allowable range, the time can be correctly corrected even though the current time information is interpreted as described above in spite of the error. That is, even though the node 100 is not capable of grasping what time it is currently, for example, because it does not have a function of managing an absolute time, it is possible to correct the time managed by the data logger 131.

For example, in a case where the elapsed time calculated from the reference number is 2000 seconds (=33 minutes and 20 seconds) and the current time information acquired from the data logger 131 is "2021/01/12 13:30:00", the calculation unit 152 calculates "2021/01/12 13:33:20", which corresponds to a time elapsed by 33 minutes and 20 seconds from "2021/01/12 13:00:00", as corrected time information.

The calculation unit 152 may calculate corrected time information by obtaining a difference of the elapsed time from the hour and correcting the current time information on the basis of a time corresponding to the difference. In the above-described example, the calculation unit 152 calculates an elapsed time of the time managed by the data logger 131 from the hour as 1800 seconds (=30 minutes and 00 seconds) on the basis of the current time information "2021/01/12 13:30:00". The calculation unit 152 can find that a difference with respect to the elapsed time calculated from the reference number is 200 seconds (=2000 seconds−1800 seconds), that is, the time managed by the data logger 131 is delayed by 200 seconds. The calculation unit 152 calculates, as corrected time information, "2021/01/12 13:33:20" obtained by adding 200 seconds (=3 minutes and 20 seconds) to the current time information "2021/01/12 13:30:00".

The setting unit 153 sets the calculated corrected time information in the data logger 131. For example, the setting unit 153 transmits a setting command for setting the corrected time information to the data logger 131. When receiving the setting command, the data logger 131 corrects the time information managed, for example, by a real time clock to the corrected time information.

Note that the node 100 may be configured to manage the time information by storing the calculated corrected time information as a current time in the storage unit 161 or the like. As a result, the node 100 can obtain complete time information including year, month, day, hour, minute, and second, without acquiring time information including year, month, day, and hour via a network according to an NTP or the like.

The storage unit 161 stores various kinds of data used in the data logger control unit 101. For example, the storage unit 161 stores a reference number received from the concentrator 200. When the node 100 is configured to manage time information therein, the storage unit 161 may store a current time. The storage unit 161 can be formed of any generally used storage medium such as a flash memory, a memory card, a RAM, an HDD, or an optical disc.

Each of the above-described units (the data logger control unit 101 and the communication control unit 110) is implemented by, for example, one or more hardware processors. For example, each of the above-described units may be implemented by causing the processor such as a CPU to execute a computer program, that is, implemented by software. Each of the above-described units may be implemented by the processor such as a dedicated IC, that is, implemented by hardware. Each of the above-described units may be implemented by software and hardware in combination. In a case where plural processors are used, each of the processors may implement one of the units, or may implement two or more of the units.

Figure 7:
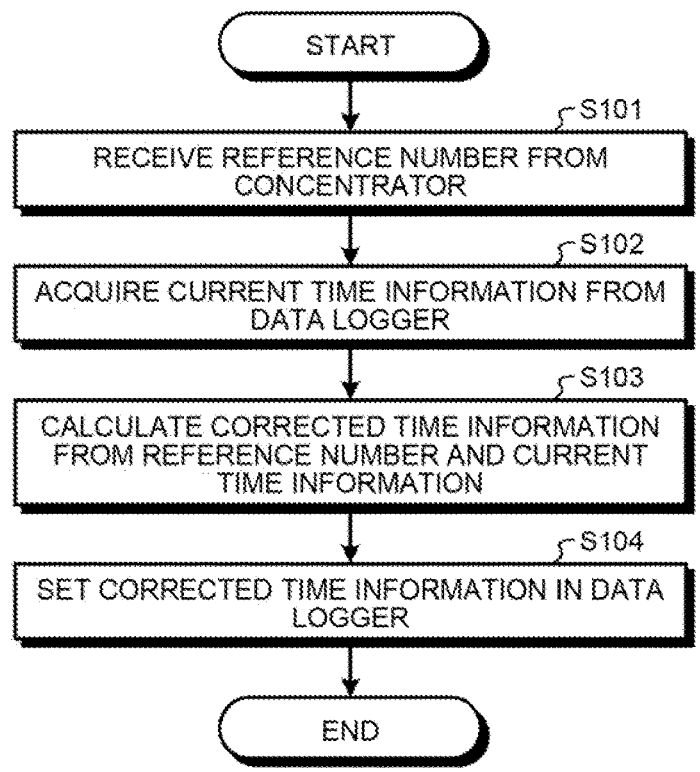
FIG. 7 is a flowchart of time correction processing.

Next, time correction processing performed by the node 100 according to the present embodiment configured as described above will be described. FIG. 7 is a flowchart illustrating an example of time correction processing in the present embodiment.

The communication control unit 110 receives a reference number from the concentrator 200 (Step 3101). The received reference number is stored, for example, in a storage medium (such as the storage unit 161) included in node 100.

The data logger control unit 101 executes correction processing (Steps S102 to S104) for correcting a time of the data logger 131 at a predetermined timing. The timing at which the correction processing is executed will be described in detail later.

The acquisition unit 151 of the data logger control unit 101 acquires current time information from the data logger 131 (Step 3102). The calculation unit 152 calculates corrected time information from the reference number and the current time information (Step S103). The setting unit 153 sets the calculated corrected time information in the data logger 131 (Step S104). Then, the correction processing ends.

Next, an example of a timing at which the correction processing is executed will be described.

For example, if the correction processing is executed immediately before or immediately after the reference number is received, that is, immediately before or immediately after the hour every hour, there is a possibility that, in a case where time information managed by the data logger 131 has a large error, a current time included in current time information acquired from the data logger 131 cannot be interpreted as being correct.

Therefore, the correction processing may be executed in a correction period determined to be a period in which the current time included in the current time information acquired from the data logger 131 can be interpreted as being correct. For example, the data logger control unit 101 (the acquisition unit 151) acquires corrected time information when the elapsed time calculated from the reference number is included in the correction period. The correction period can be, for example, 10 minutes from 25 minutes to 35 minutes after the hour every hour.

The correction processing may be executed within the correction period using any method. For example, the correction processing can be executed at the beginning every certain number of time slots among time slots within the correction period. The certain number of time slots may be, for example, a plurality of time slots included in one or more super frames (which will be described in detail later). For example, in a case where the certain number of time slots correspond to 30 seconds, the correction processing is executed 20 times for 10 minutes from 25 minutes to 35 minutes after the hour every hour.

In a case where the elapsed time after the correction processing is short and the time managed by the data logger 131 is less likely to greatly deviate, the correction processing may not be executed. For example, the data logger control unit 101 (the acquisition unit 151) is configured not to acquire current time information when the time elapsed after the corrected time information is set by the setting unit 153 is smaller than a threshold (first threshold). The data logger control unit 101 may be configured not to execute next correction processing, for example, until time (X+L) or later (L is an integer of 1 or more) in a case where correction processing is executed at time X.

As described above, in a case synchronization of current time information cannot be executed, the concentrator 200 may not transmit a reference number. If the node 100 fails to receive a reference number for a long period of time, the node 100 may not be able to correctly calculate a time elapsed from the hour corresponding to the reference number received at an immediately previous timing. Therefore, the correction processing may not be executed in a case where a long period time has elapsed after the reference number is received. For example, the data logger control unit 101 (the acquisition unit 151) is configured not to acquire current time information when the time elapsed after the reference number is received is greater than a threshold (second threshold). The data logger control unit 101 may be configured not to execute correction processing, for example, at time (X+M) or later (M is an integer of 1 or more) in a case where the reference number is received at time X.

A timing for correction processing may be determined considering sensor data acquisition processing performed by the data logger 131. For example, the acquisition unit 151 acquires an interval at which sensor data is sensed, in addition to the current time information, from the data logger 131. In a case where the number of sensor data acquisition times included in a period between the current time information acquired from the data logger 131 and the corrected time information calculated by the calculation unit 152 (or the current time managed in the node 100) is N or more (N is an integer of 1 or more), the setting unit 153 does not set the corrected time information. Note that the number of sensor data acquisition times can be calculated from the sensing intervals.

As a result, the time correction makes it possible to avoid a deviation in a time at which the sensor data is acquired, thereby preventing, for example, a case where sensor data that needs to be acquired cannot be acquired or a case where sensor data corresponding to the same time is doubly acquired.

As described above, according to the present embodiment, each of the nodes 100 can correct current time information managed by an electronic device using a reference number synchronized by a time-division multiplexing technique and the current time information managed by the electronic device. As a result, even in a case where the node 100 does not have a function of managing a complete time therein, the time of the electronic device can be corrected. It is not necessary to transmit and receive an absolute time in the network in managing a complete time. Therefore, since the node 100 can further reduce a time required for wireless transmission and increase a sleep time, power consumption can be reduced.

First Modification

The communication system may include a relay node (relay device). The relay node is a node having a function of relaying (transferring) sensor data transmitted from another node 100. The relay node may not include, for example, some or all of functions for acquiring sensor data (the functions of the data logger interface 122 and the data logger control unit 101), among the functions of the components of the node 100 in FIG. 5.

The node 100 having the configuration illustrated in FIG. 5 may operate as a relay node. For example, the node 100 may operate as a relay node in a case where it is detected that the data logger 131 is not connected to the node 100 when the node 100 is started up. Moreover, the node 100 may operate as a relay node in a case where its operation mode is set in advance so that it operates as a relay node.

Second Modification

The setting unit 153 may be configured not to set the corrected time information when a difference between the current time information acquired from the data logger 131 and the calculated corrected time information is smaller than a reference value R1 (first reference value, e.g., 5 seconds).

When the difference is greater than or equal to the reference value R1 and smaller than a reference value R2 (second reference value), the setting unit 153 may further determine whether to set the corrected time information considering sensor data acquisition processing. The reference value R2 is a value greater than the reference value R1. For example, when the difference is greater than or equal to the reference value R1 and smaller than the reference value R2, and the number of sensor data acquisition times included in the period between the current time information and the corrected time information is N or more, the setting unit 153 does not set the corrected time information.

Thereafter, the above-described determination is repeated at a timing for calculating corrected time information. When the number of times of repetition is greater than a threshold, the setting unit 153 may set the corrected time information.

When the difference is greater than or equal to the reference value R1 and smaller than the reference value R2, and the number of sensor data acquisition times included in the period between the current time information and the corrected time information is smaller than N, the setting unit 153 sets the corrected time information.

When the difference is greater than or equal to the reference value R2, the setting unit 153 may set the corrected time information regardless of whether or not a sensor data acquisition time is included in the period between the current time information and the corrected time information.

Third Modification

In a case where the data logger 131 is connected to, for example, a GPS or the like and has a function of correcting a time, the node 100 does not need to correct the time information of the data logger 131. Therefore, it may be determined whether or not execution of correction processing is necessary with reference to setting information as to whether or not the data logger 131 executes processing for correcting the time information. In a case where a plurality of data loggers 131 are connected to the node 100, the setting information may be set for each of the data loggers 131.

When the setting information indicating that correction processing is to be executed is set, the data logger control unit 101 executes the correction processing according to the above-described embodiment. When the setting information indicating that correction processing is not to be executed is set, the data logger control unit 101 does not execute the correction processing. The data logger control unit 101 may be configured to inquire whether or not the data logger 131 has a function of correcting a time, and execute no correction processing when it is detected that the data logger 131 has a function of correcting a time.

Fourth Modification

The time information managed by the data logger 131 may return to a previous time according to the correction processing. In such a case, sensor data may be recorded in the internal memory of the data logger 131 multiple times at the substantially same timing. However, since the sensor data is recorded multiple times at the substantially same timing, it may not be necessary to transmit all of the sensor data in the wireless multi-hop network. Therefore, considering sensor data (first output data) transmitted previous time and an elapsed time from a time (first time) at which the sensor data is transmitted previous time, the node 100 (the communication control unit 110) may determine whether to transmit sensor data (second output data) acquired thereafter.

For example, when the sensor data transmitted previous time and the sensor data acquired this time are the same and the elapsed time is smaller than a threshold (third threshold), the node 100 does not generate a message for transmitting the sensor data acquired this time and does not transmit the sensor data. As a result, it is possible to further reduce an amount of data to be transmitted.

Fifth Modification

So far, each an example in which a time slot number is used as a number indicating a communication timing has been mainly described. Alternatively, a slot frame number may be used as a number indicating a communication timing.

Figure 8:
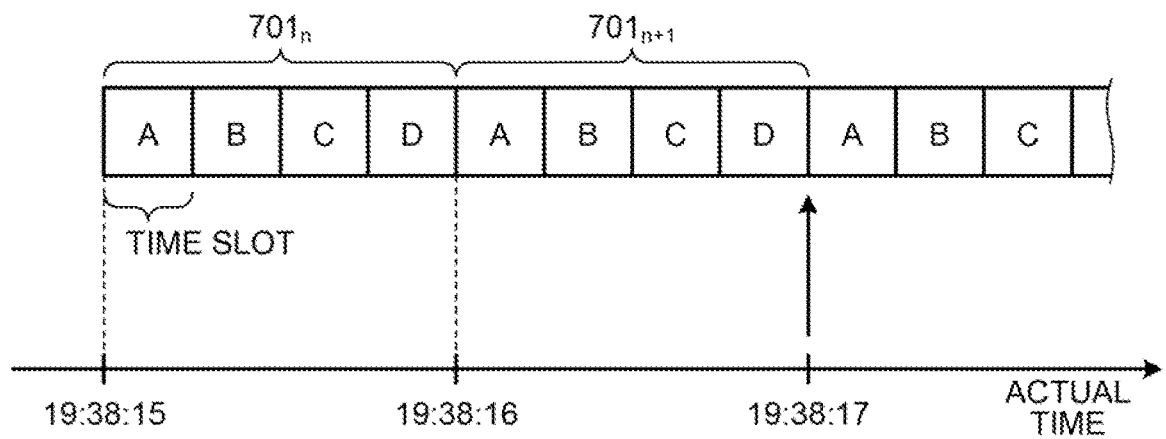
FIG. 8 is a diagram illustrating a relationship between an actual time and a time-division multiplexing slot frame.

FIG. 8 is a diagram illustrating a relationship between an actual time and a time-division multiplexing slot frame. The slot frame is a unit of a schedule including a certain number of time slots. In FIG. 8, slot frames $701_n$ and $701_{n+1}$ each include four time slots. Similarly to the time slot, a slot frame number is assigned to the slot frame. By using the slot frame number, it is possible to collectively transmit more sensor data.

Sixth Modification

Figure 9:
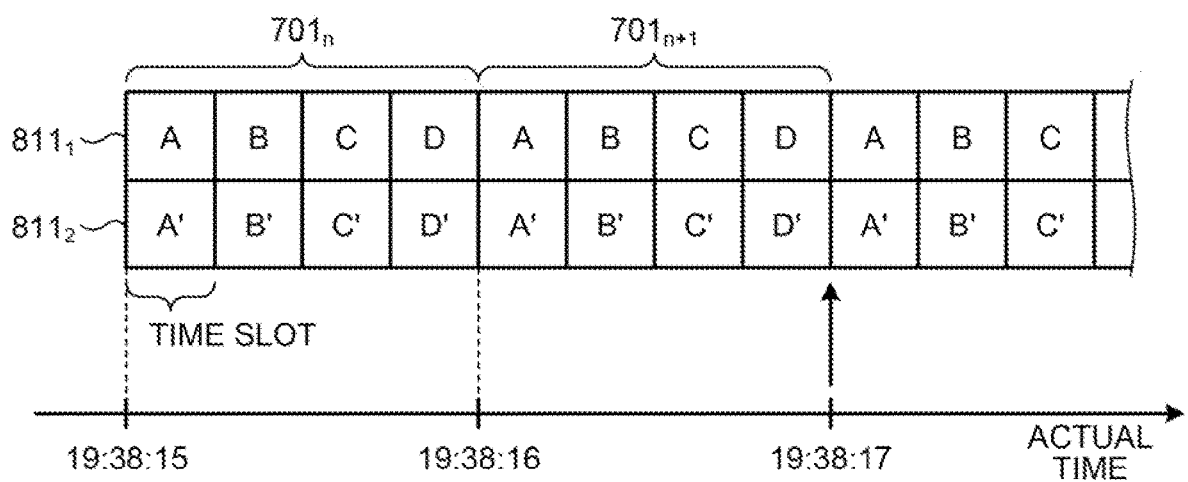
FIG. 9 is a diagram illustrating a relationship between an actual time and a time-division multiplexing slot frame.

One or more channels (frequencies) may be used in a time-division multiplexing technique. For example, in TSCH, a channel used is changed every time data is transmitted or received. The method according to the above-described embodiment can also be applied to such a time-division multiplexing technique. FIG. 9 is a diagram illustrating a relationship between a relationship between an actual time and a time-division multiplexing slot frame in a case where two channels $811_1$ and $811_2$ are used.

In such a time-division multiplex communication schedule, a channel used for communication is designated in addition to a time slot number. The channel may be designated with a channel offset. The concentrator 200 and the node 100 transmit and receive sensor data by the designated channel.

Seventh Modification

A super frame number may be used as a number indicating a communication timing.

Figure 10:
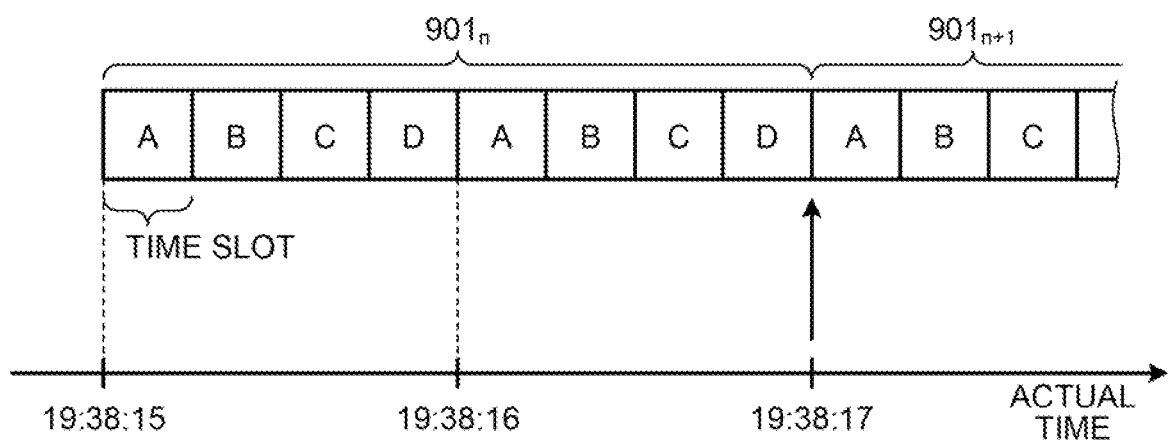
FIG. 10 is a diagram illustrating a relationship between an actual time and a time-division multiplexing super frame.

FIG. 10 is a diagram illustrating a relationship between an actual time and a time-division multiplexing super frame. The super frame is a unit of a schedule including a given number of slot frames. In FIG. 10, super frames $901_n$ and $901_{n+1}$ each include two slot frames. A super frame number is assigned to the super frame. By using the super frame number, it is possible to collectively transmit more sensor data.

The super frame has a longer period than the time slot. Therefore, in order to notify a time with higher accuracy, the node 100 may transmit an offset of a time slot in the super frame in addition to the super frame number. The offset of the time slot is, for example, an offset with respect to the initial time slot of the super frame. For example, the communication control unit 110 transmits, to the concentrator 200, sensor data in which the super frame number and the offset of the time slot in the super frame are associated with each other as data indicating a time.

Eighth Modification

Rather than transmitting a time slot number itself, a slot frame number itself, or a super frame number itself, each corresponding to a timing at which sensor data is acquired, the node 100 (the communication control unit 110) may transmit a difference between the time slot number, the slot frame number, or the super frame number and a current time slot number, a current slot frame number, or a current super frame number, respectively, each corresponding to a time point when a message is processed (an example of a second number).

Such a current time slot number, a current slot frame number, or a current super frame number may already be included in a message transmitted or be received in the wireless multi-hop network. The communication control unit 110 then transmits only a difference from the already-included number as data indicating a time. As a result, it is possible to further reduce an amount of data to be transmitted.

In a configuration in which a number indicating a communication timing used in a communication technique such as a time-division multiplexing technique is used in place of a time at which output data such as sensor data is generated, it is possible to reduce an amount of data required when the output data is transmitted.

Figure 11:
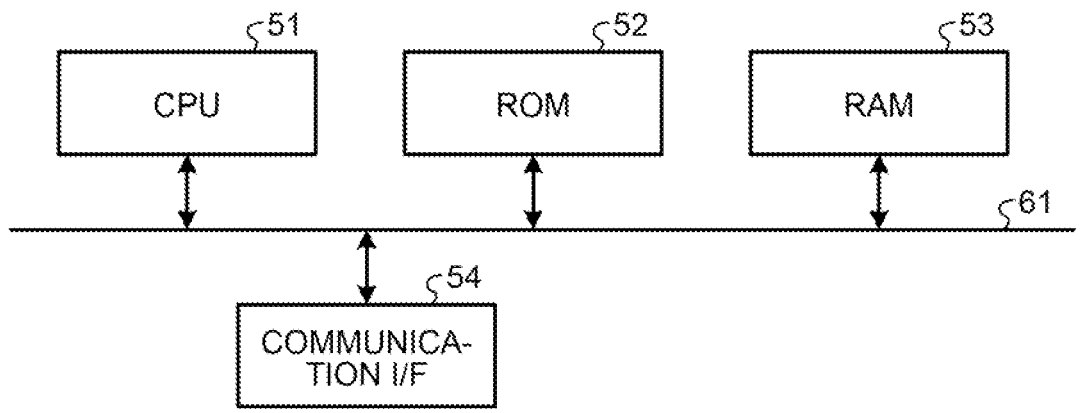
FIG. 11 is a hardware configuration diagram of a device according to an embodiment.

Next, a hardware configuration of the device (the concentrator and the node) according to the embodiment will be described with reference to FIG. 11. FIG. 11 is an explanatory diagram illustrating an example of the hardware configuration of the device according to the embodiment.

The device according to the embodiment includes a control device such as a CPU 51, storage devices such as a read only memory (ROM) 52 and a RAM 53, a communication I/F 54 connected to a network to perform communication, and a bus 61 connecting the aforementioned units to each other.

A computer program to be executed by each device according to the embodiment is installed in advance in the ROM 52 or the like.

The program to be executed by the device according to the embodiment may be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

Moreover, the program to be executed by the device according to the embodiment may be stored on a computer connected to a network such as the Internet, and provided by being downloaded via the network. Alternatively, the program to be executed by the device according to the embodiment may be provided or distributed via a network such as the Internet.

The program to be executed by the device according to the embodiment may cause a computer to function as each unit of the above-described device. In this computer, the CPU 51 can read the program from a computer-readable storage medium onto a main storage device to execute the program.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   one or more processors configured to:
   acquire, from at least one electronic device, output data output from the electronic device and current time information managed by the electronic device;
   communicate with a server device using a communication technique in which numbers indicating communication timings are synchronized;
   transmit the output data to the server device;
   calculate corrected time information by correcting the current time information on the basis of a reference number indicating a number serving as a reference; and
   set the calculated corrected time information in the electronic device.

2. The communication device according to claim 1, wherein
   the reference number represents every hour on the hour, the current time information includes a current hour, a current minute, and a current second, and
   the one or more processors calculate the corrected time information by replacing the current minute and the current second with a minute and a second corresponding to an elapsed time from the hour represented by the reference number.

3. The communication device according to claim 1, wherein
   the current time information includes a current hour, a current minute, and a current second, and
   the one or more processors store, in a storage, the corrected time information including an hour, a minute, and a second to which at least one of the current hour, the current minute, and the current second are corrected.

4. The communication device according to claim 1, wherein
   the one or more processors do not acquire the current time information when an elapsed time after setting the corrected time information in the electronic device is smaller than a first threshold.

5. The communication device according to claim 1, wherein
   the one or more processors do not acquire the current time information when an elapsed time after the reference number being received is greater than a second threshold.

6. The communication device according to claim 1, wherein
   the one or more processors acquire the corrected time information when an elapsed time from the hour represented by the reference number is included in a predetermined correction period.

7. The communication device according to claim 1, wherein
   the one or more processors do not set the corrected time information when a difference between the corrected time information and the current time information is smaller than a first reference value.

8. The communication device according to claim 7, wherein
   the one or more processors do not set the corrected time information when the difference is greater than or equal to the first reference value and smaller than a second reference value that is a value greater than the first reference value, and the number of times at which the output data is acquired from the electronic device in a period between the corrected time information and the current time information is N or more, N being an integer of 1 or more.

9. The communication device according to claim 1, wherein
   the one or more processors do not set the corrected time information when the number of times at which the output data is acquired from the electronic device in a period between the corrected time information and the current time information is N or more, N being an integer of 1 or more.

10. The communication device according to claim 1, wherein
    the one or more processors do not acquire the current time information from the electronic device when setting information for not executing correction processing of the time information is set for the electronic device.

11. The communication device according to claim 1, wherein
    the one or more processors do not acquire the current time information from the electronic device when it is detected that the electronic device has a time correction function.

12. The communication device according to claim 1, wherein
    when first output data transmitted at a first time and second output data acquired after the first time are the same and an elapsed time from the first time is smaller than a third threshold, the one or more processors do not transmit the second output data.

13. The communication device according to claim 1, wherein
the electronic device is at least one of a sensor that outputs a result of detecting a predetermined physical quantity as the output data and a data recording device that records the output data detected by the sensor in a storage medium.

14. The communication device according to claim 1, wherein
the communication technique is a time-division multiplexing technique.

15. The communication device according to claim 14, wherein
each of the numbers is a time slot number, a slot frame number, or a super frame number managed using the time-division multiplexing technique.

16. A computer program product having a non-transitory computer readable medium including programmed instructions, wherein the instructions, when executed by a computer, cause the computer to:
acquiring, from at least one electronic device, output data output from the electronic device and current time information managed by the electronic device;
communicating with a server device using a communication technique in which numbers indicating communication timings are synchronized;
transmitting the output data to the server device;
calculating corrected time information by correcting the current time information on the basis of a reference number indicating the number serving as a reference; and
setting the calculated corrected time information in the electronic device.

17. A communication system comprising a server device and one or more communication devices,
wherein the server device communicates with the one or more communication devices using a communication technique in which numbers indicating communication timings are synchronized, and
each of the one or more communication devices includes:
one or more processors configured to: acquire,
from at least one electronic device, output data output from the electronic device and current time information managed by the electronic device;
transmit the output data to the server device;
calculate corrected time information by correcting the current time information on the basis of a reference number indicating a number serving as a reference; and
set the calculated corrected time information in the electronic device.

18. The communication system according to claim 17, wherein
the server device does not transmit the reference number to the communication device when a managed current time is not correct.

* * * * *